Figure 1:
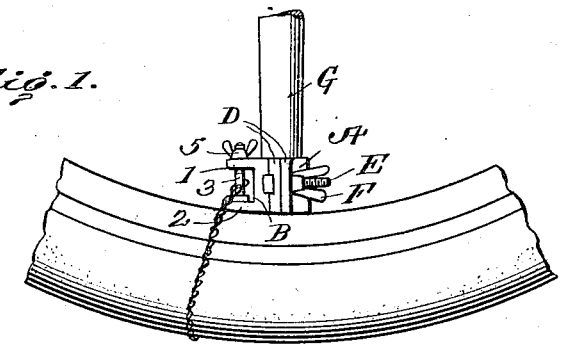

L. E. WHITE.
FASTENING MEANS.
APPLICATION FILED MAY 14, 1918.

1,281,456.

Patented Oct. 15, 1918.

Inventor
Leverett E. White
By Wm. H. Babcock & Son
Attorneys

UNITED STATES PATENT OFFICE.

LEVERETT E. WHITE, OF SPRINGFIELD, MASSACHUSETTS, ASSIGNOR TO THE STEEL PRODUCTS COMPANY, OF PLANTSVILLE, CONNECTICUT, A CORPORATION OF CONNECTICUT.

FASTENING MEANS.

1,281,456.        Specification of Letters Patent.        Patented Oct. 15, 1918.

Application filed May 14, 1918. Serial No. 234,423.

*To all whom it may concern:*

Be it known that I, LEVERETT E. WHITE, a citizen of the United States, residing at Springfield, in the county of Hampden and State of Massachusetts, have invented certain new and useful Improvements in Fastening Means, of which the following is a specification.

This invention relates to fastening means or clamps, more particularly to one of the plates or members of a two-plate clamp, and resides especially in the means for readily securing thereto or therein the links of a chain or part or parts of some element or elements, and in the means for locking said means in position and preventing its shifting by vibration.

The invention hereinafter set forth and described is in the form of a clamp and is intended primarily by applicant for use in attaching anti-skidding chains, of the fixed point type, to the spokes of an automobile wheel, in which use the device is subject to severe and rapid vibration such as would cause an ordinary nut or fastening means to become disengaged. The invention may, however, be embodied in a number of other different forms of plates to be fixed in position in various manners. Likewise, while primarily intended for use with anti-skidding devices, as above mentioned, it can be used equally well for a great variety of purposes.

The object of the present invention is to provide a plate with a pin arranged at an interval from the parallel face thereof and having a portion, in normal position, located between two rigid surrounding parts, which pin is to have releasable locking means permitting it to be released and moved endwise slightly so that the links of a chain may be slipped over the end of the pin and, when it is locked in normal position, held by the portion of said pin between said rigid parts. Other objects are to so form the pin, plate and lock that the locking device will become jammed in the plate guarding against its becoming loose due to rapid and constant vibration; to so form the pin, plate and locking device that the pin cannot be removed until the locking means, or collar, is removed therefrom; and to combine in the locking means the two functions of locking the pin and of a powerful pulling and pushing device to pull the pin free in case it gets stuck by freezing or other causes and to push it back into position after the chain links have been slipped over the end thereof in case the recess 7 or the part 4 of the pin is clogged or coated with ice, mud, dirt or other obstructive agent.

The primary consideration of this invention is the cone-type locking means for the pin, preventing disengagement of the nut 5 with the wall of flange 1 by the rapid and constant vibration to which it is subject in the use primarily in view. This pin may be used in many ways, among others, in the way shown in the drawings, receiving itself the terminal links of the chain, but I do not wish to be understood as limiting myself to the manner of use shown, this being only the preferred use.

Figure 2:
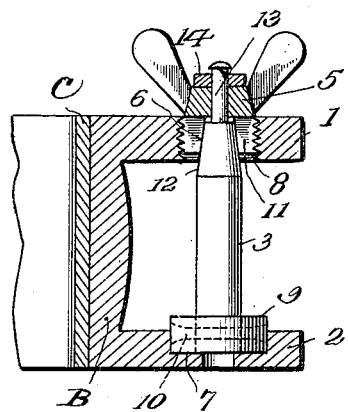
Figure 3:
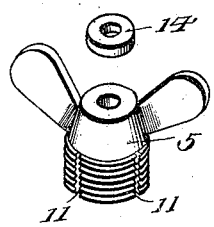
Figure 4:
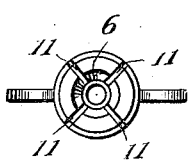

In the accompanying drawings, in which only the preferred form is illustrated:

Figure 1 represents a side elevation of a segment of a wheel, with a device embodying my invention applied to a spoke thereof;

Fig. 2, a central cross-sectional view through plate B;

Fig. 3, a perspective view of the pin with its locking nut and washer in superposed relation; and Fig. 4, a bottom plan view of the nut alone.

Referring now in detail to the drawings, A and B indicate the respective clamp plates having a rubber treated lining C and provided with perforated end flanges D for the reception of bolts E on which wing nuts F are screwed to draw the two plates toward each other on some intervening object, such as spoke G.

All of the parts as thus far described are old and well known.

The plate B is provided with two projecting parts or flanges 1 and 2, preferably, though not necessarily, integral and preferably parallel to each other. The flange 1 is provided with an internally screw-threaded hole 8 and the flange 2 is provided with a recess 7, which is of greater diameter than hole 8. Hole 8 and recess 7 preferably have a common axial line, and the central portion of the recess may be extended through the flange 2 to facilitate casting and to permit the escape of any foreign matter that may lodge in said recess.

A pin 3 is inserted through hole 7 and has its lower end provided with a transverse perforation. A collar 9 provided with two diametrically opposite outwardly flaring bores is then slipped over said end of the pin 3 and moved thereon until its bores register with the perforation in said pin. A rivet 10 is then passed through said perforations and bores and has its ends spread, as shown in dotted lines in Fig. 2, preventing its removal from said parts. The ends of this rivet 10 are flush with the exterior of the collar 9, which just fits snugly in the recess 7 and is too large to pass through the hole 8.

The above step may be completed before the pin 3 is brought into assembly with the plate B, in which case the lock nut 5, having a tapering inner face 6 and divided from top to bottom of its screw-threaded portion into a plurality of segments, four being shown in the drawing, by slots 11, is still to be mounted on the correspondingly tapered or cone-shaped upper end portion 12 of pin 3. In the form shown this is accomplished by providing the upper end portion with a reduced stem 13 over which the nut 5 is to be slipped. A washer 14 is next slipped over the end of said stem 13, the extreme end of which is then to be riveted over, as shown in Fig. 2.

The device is now ready for use.

If preferred, the locking nut 5 may first be fastened on the upper end of the pin 3, the lower end thereof inserted downwardly through hole 8 and the collar 9 then affixed to the lower end, as above explained.

In operation, the nut 5 will be turned out until free of flange 1, the terminal chain links will then be applied and the pin shoved down through hole 7 until the thread of nut 5 engages the thread in the wall of flange 1, when the nut 5 will be turned in, its slotted portion being gradually spread as it rides down over the cone-shaped portion 12 of pin 3 until it cannot be turned farther, jamming the thread of the nut 5 radially into the thread of the vertical wall of flange 1, and locking said nut against turning by vibration and the like.

The lower wall of the recess 7 will act, of course, as a stop for said pin, holding it against longitudinal movement in order that its portion 12 may spread the slotted portion of nut 5.

Any suitable material may be used for any part.

Having thus described my invention, what I claim as new and desire to secure by Letters Patent is:

1. A plate, in combination with a pin mounted thereon and having a tapering portion, means working thereon, engaging said plate and spread by said tapering portion of said pin to expand said means radially into tight engagement with said plate, said plate being provided with means engaging said pin to prevent longitudinal movement thereof in the direction of travel of said first mentioned means during expansion thereof.

2. A plate having a perforated portion, in combination with a pin having a portion located in said perforation, having one end portion provided with an enlargement that cannot pass through said perforation, and having its other end portion tapering, means working longitudinally thereon, engaging the wall of said hole and spread by said tapering portion of said pin to expand into tight engagement with said wall of said perforation, said enlarged end portion of said pin engaging a fixed part preventing longitudinal movement of said pin while said means is being spread.

3. A plate having a perforated portion, in combination with a pin having a portion located in said perforation and provided with a tapering portion, means working longitudinally thereon, engaging the wall of said perforation and spread by said tapering portion of said pin to expand into tight engagement with said wall of said perforation, the opposing faces of said pin and said means being smooth.

4. A plate and a part mounted thereon and provided with a tapering portion, in combination with means engaging said tapering portion and expanded by the same into tight engagement with a portion of said plate to lock part in normal position.

5. A plate and a part mounted thereon and provided with a tapering portion, in combination with means engaging said tapering portion and expanded by the same into tight engagement with a portion of said plate to lock said part in normal position, and means limiting the travel of said part against the thrusting action of said first mentioned means during expansion.

6. A plate having a perforated flange and a recessed portion, in combination with a pin adapted to be moved longitudinally in said perforated flange, provided with a part snugly fitting said recess in normal position and too large to pass through said perforation, and having a tapered portion, and means working longitudinally on said pin and adapted to be expanded by the tapered portion of the same into tight engagement with the walls of said perforation to lock said pin in normal position, said recessed portion preventing longitudinal movement of said pin while said means is being moved to said engaging position.

7. A plate and a part mounted thereon, in combination with means mounted on said part to have movement thereon and adapted to be expanded by the same into tight engagement with a portion of said plate to lock said part in normal position, and means for preventing the separation of said first mentioned means from said part.

8. A plate and a part mounted thereon, in combination with means mounted on said part to have movement thereon and adapted to be expanded by the same into tight engagement with a portion of said plate to lock said part in normal position, and means for preventing the separation of said part from said plate.

9. A plate having an internally screw-threaded perforation and a part mounted therein, in combination with a nut having a plurality of slots for a portion of its length and externally screw-threaded to engage the threads in the wall of said perforation, means for holding said part against longitudinal movement while said nut is being screwed into said perforation, and means for preventing the separation of said pin from said plate, the opposing faces of said nut and said pin being so formed that the latter will expand the former into tight engagement with the wall of said perforation as it is turned home therein.

10. A plate having an internally screw-threaded perforation and a part mounted therein, in combination with a nut having a plurality of slots for a portion of its length and externally screw-threaded to engage the thread in the wall of said perforation, means for holding said part against longitudinal movement while said nut is being screwed into said perforation, and means for preventing the separation of said nut from said part, the opposing faces of said nut and said part being so formed that the latter will expand the former into tight engagement with the wall of said perforation as it is turned home therein.

In testimony whereof, I have signed my name to this specification in the presence of two subscribing witnesses.

LEVERETT E. WHITE.

Witnesses:
   Louis W. Chism,
   Warren D. Chase.

Copies of this patent may be obtained for five cents each, by addressing the "Commissioner of Patents, Washington, D. C."